Dec. 8, 1959  H. COGGER  2,916,335
BEARING ASSEMBLY
Filed Aug. 12, 1957

INVENTOR.
HOWARD COGGER
BY
*Robert A. Sloman*
ATTORNEY

United States Patent Office 2,916,335
Patented Dec. 8, 1959

2,916,335

BEARING ASSEMBLY

Howard Cogger, Livonia, Mich., assignor to Acme Ball Bearing & Mfg. Co., Detroit, Mich., a corporation of Michigan Application August 12, 1957, Serial No. 677,641

13 Claims. (Cl. 308—187.1)

This invention relates to ball bearings and rollers, and more particularly to ball bearing assemblies adapted for use in conjunction with various mechanisms such as conveyors, trolleys, wheels and rollers such as might be used with conveyor chains, or other mobile devices.

Heretofore in ball bearing construction, various means have been provided for sealing off their lubricated interiors, none of which has been completely successful in preventing the entry of dirt, dust and moisture, with the result of rusting so that the ball bearing life is greatly reduced.

In the construction of the ball bearings as assembled into a wheel or roller at least one side, and sometimes both sides of the bearing adjacent the axle or support are partly open.

The present invention has for its primary object a novel form of flexible oil seal retainer which is immovably secured upon the relatively stationary shank of the inner race, retainingly engages the felt or other seal and includes an outer annular surface portion adapted for continuous surface contact with a rotatable closure plate or retainer mounted on the outer race.

It is the further object herein to provide a novel resilient seal retainer immovably secured upon the inner ball race of the bearing, loosely nested within the relatively rotatable outer race, and with an outer annular radial portion of the flexible retainer in sweeping surface contact with a corresponding inner annular surface of a second retainer disc loosely positioned with respect to the inner race and retained within the outer race for movement therewith.

It is another object herein to provide the flexible retainer of one metal and the relatively movable retainer disc of a different metal whereby surface contact between the two members will result in a minimum of friction.

It is another object hereof to provide one of said retainers of a non-ferrous metal and the other of a ferrous metal for the purpose of effecting an efficient seal between the two relatively movable members and for minimizing friction.

It is still a further object to provide the inner flexible seal retainer disc of a brass or bronze, or the equivalent and to provide the outer retainer disc of relatively rigid steel.

It is another object to provide a bearing or wheel or roller assembly wherein the inner race includes shanks projecting through both sides of the outer race axially thereof and wherein both of the open sides of the outer race are sealed against the admission of dirt or moisture by the use of pairs of said flexible and non-flexible discs arranged upon opposite sides of the outer race.

It is another object herein to incorporate this structure into a roller utilizing two or more sets of ball bearings such as might be employed in a conveyor chain, for example.

These and other objects will be seen from the following specification and claims in conjunction with the appended drawing in which:

It will be understood that the above drawing illustrates merely several preferred embodiments of the invention and that other embodiments are contemplated within the scope of the claims hereafter set forth.

Figure 1:
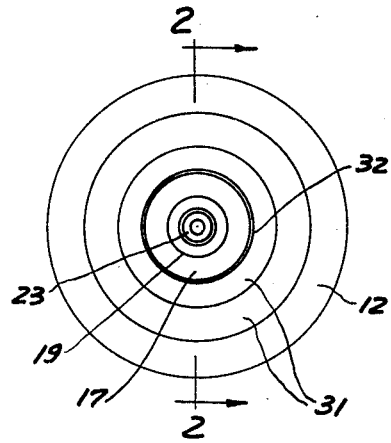
Fig. 1 is a front elevational view of one form of the present ball bearing.
Figure 2:
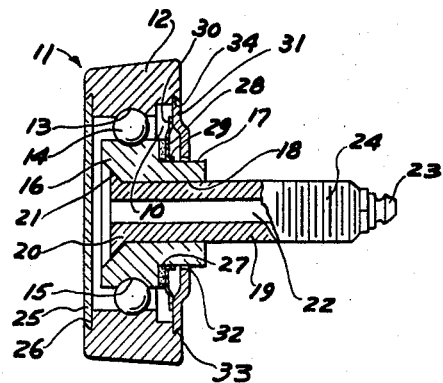
Fig. 2 is a vertical section taken on line 2—2 of Fig. 1.

Referring to Figs. 1 and 2 there is shown the ball bearing 11 which includes outer race 12 in the form of a wheel having an inner annular groove 13 to cooperatively receive a circular row of spaced balls 14. These balls are supported within the annular groove 15 upon the exterior of the inner bearing race 16. A conventional ball retainer is used but is omitted from the drawing.

The inner race is loosely nested within outer race 12, is centrally apertured and includes the outwardly projecting circular shank 17 of reduced diameter, whose bore 18 is adapted to snugly and tightly receive mounting spindle 19. Said spindle includes tapered enlarged head 20 which cooperatively nests within the countersunk aperture 21 upon one side of race 16.

Spindle 19 has an axial bore 22 whose inner end communicates with the interior of outer race 12, and whose opposite end terminates in the grease fitting 23. Said spindle is exteriorly threaded at 24 to provide a means of fixedly mounting inner race 16 upon a suitable support, such as the support bracket of a conveyor assembly for illustration.

In the present embodiment, Fig. 2, one end of the outer race is closed. This is accomplished in the present illustration by the disc or dust plate 25 whose tapered annular edge is nested and retained within a correspondingly tapered undercut recess 26 formed within one end of race 12.

Shank 17 as a reduced extension of race 16 provides therewith an abutment shoulder against which the annular seal, such as a felt seal 27 is positioned, said seal snugly extending around shank 17.

Flexible disc 28 preferably constructed of a non-ferrous metal such as brass or bronze or the like, includes the centrally apertured flange 29 which is tightly pressed or otherwise secured upon shank 17 being so positioned as to retainingly engage felt seal 27.

Said flexible disc has an outer radial and annular flat wall portion 30 positioned loosely within the central chamber 10 of outer race 12. Bearing assembly is completed by the retainer disc 31 which is centrally apertured at 32 for loose positioning axially over shank 17.

The disc 31 is preferably constructed of a ferrous metal such as steel and is suitably secured within the body of race 12 at the end thereof opposite from closure plate 25. For this purpose disc 31 includes the tapered edge 33 which is retainingly nested within the undercut similarly tapered annular slot 34 formed upon the interior surface of race 12.

When the retainer disc 31 is in the position shown in Fig. 2, an annular and radial inner surface portion thereof is in sweeping and sliding contact with the corresponding annular radial edge 30 of flexible disc 28. The continuous peripheral surface contact of disc 28 with relatively rotatable disc 31 effectively seals off the interior chamber 10 on said outer race from exterior dirt and moisture. This is particularly beneficial in view of the required clearance space 32 between shank 17 and relatively rotatable disc 31, which otherwise would permit entrance of dirt and moisture to the interior of the bearing assembly.

Figure 3:
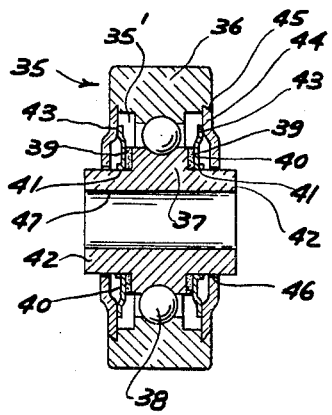
Fig. 3 is a similar view of a ball bearing or roller, as a variation of the structure shown in Fig. 2.

A slightly different form of ball bearing or roller bearing is shown in Fig. 3. Whereas one end of outer race 12 in Fig. 2 is closed; in Fig. 3 both sides of the outer race are open inasmuch as the shank 42 of inner race 37 projects through and outwardly of both faces of outer race 36.

Roller 35 of Fig. 3 also includes the circular row of spaced balls 38, there being a suitable and conventional ball retainer employed normally spacing the balls apart. However, for simplicity, this retainer is omitted from the drawing in Figs. 2, 3 and 4.

Felt or other fabric or the equivalent circular seals 39 are mounted over the outwardly projecting shanks 42 of inner race 37, and abut the shoulders of said inner race upon its opposite sides. The flexible, preferably non-ferrous, resilient discs 40 are mounted tightly over shanks 42. Each of the discs 40 is centrally apertured and includes the internal annular flange 41 which is pressed tightly onto a corresponding shank providing a rigid mounting thereon with intermediate portions of the flexible discs retainingly engaging felt seals 39.

The outer peripheral and radial portions 43 of the flexible discs are displaced longitudinally outward partially from the respective planes of the central portions of said discs and are positioned within the central opening 35' within the outer race, Fig. 3.

A pair of retainer discs 44, centrally apertured at 46, are loosely positioned over and around shanks 42 and are peripherally secured to internal annular portions of outer race 36. For this purpose the edges of discs 44 are tapered at 45 and are forced into the undercut annular notches formed within the body of the outer race in the same manner as in Fig. 2. Inner race 37 has an axial bore 47 by which it may be mounted upon a support body and secured thereto.

As shown in Fig. 3, annular internal surface portions of both of the retainer discs 44 are so arranged as to be in sweeping surface contact throughout the arc of 360 degrees with respect to the outer radial edge 43 of the flexible disc throughout its periphery.

Figure 4:
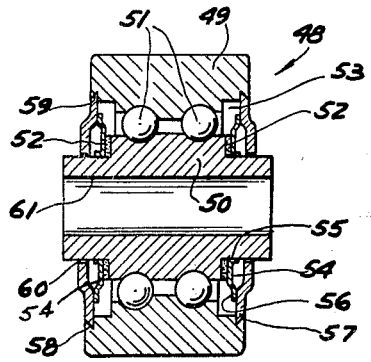
Fig. 4 is similar view of still another variation thereof.

Fig. 4 shows a structure substantially the same as in Fig. 3 using the sealing arrangement shown but with the exception that a pair of spaced rows of balls 51 are employed between outer race 49 and inner race 50. Similarly there are a pair of felt sealing rings 52 mounted upon the opposing shanks of the inner race which has an axial bore 61.

The flexible preferably non-ferrous discs 54 include the centrally apertured inner annular flanges 55 immovably pressed upon said shanks in retaining engagement with said seals, and terminate in the outer annular and radial edge portions 56 which are loosely positioned within the outer race internal chamber 53.

A pair of outer retainer discs 57, preferably constructed of a ferrous metal such as steel, include outer annular tapered edges 58 retainingly positioned within undercut tapered slots 59 in the opposite ends of outer race 49. These discs are centrally apertured at 60 to loosely receive the projecting shoulders of inner race 50.

Internal annular and radial surface portions of discs 57 are in continuous sweeping surface contact with the corresponding flexible radial portions 56 of discs 54, completing the seal assembly.

In normal operation the inner race is stationary upon a suitable support, such as the spindle 24 of Fig. 2 and accordingly the flexible discs 54 are also stationary. The outer race 49 however rotates with respect thereto, and rotatable with said outer race are the end retainers 57, in surface contact with the peripheral surface portions of the flexible discs throughout arcs of 360 degrees. This construction is for the purpose of sealing off the interior of the outer race from dust, dirt, and moisture and to thus prolong the life of the ball bearing or roller bearing and prevent rust of the internal parts thereof. It is contemplated that the outer race may be relatively stationary and the inner race rotatable, achieving the same results.

Having described my invention, reference should now be had to the following claims.

I claim:

1. In a ball bearing having an outer race and an apertured inner race with a row of balls interposed therebetween, one end of said outer race being closed, a centrally apertured shank of reduced diameter on said inner race projecting through the open end of the outer race, an annular grease seal on said shank bearing against said inner race, a centrally apertured flexible disc tightly secured on said shank retainingly engaging said seal and including a flattened outer annular edge loosely positioned within said outer race, and a centrally apertured retainer disc loosely positioned over said shank peripherally retained within said outer race and with an intermediate interior annular surface portion thereof in sliding surface contact with the annular edge of said flexible disc, sealing off the interior of said outer race from dirt and moisture.

2. In the ball bearing of claim 1, said flexible disc being of one metal and said retainer disc being of a different metal.

3. In the ball bearing of claim 1, one disc being of a non-ferrous metal and the other of a ferrous metal.

4. In the ball bearing of claim 1, said flexible disc being of non-ferrous metal and said retainer disc being of a ferrous metal.

5. In the ball bearing of claim 1, said flexible disc being constructed of brass and said retainer disc of steel.

6. In the bearing of claim 1, said flexible disc including a centrally apertured annular flange tightly pressed onto said shank, said flexible disc being of non-ferrous metal, said retainer disc being of a ferrous metal.

7. The bearing of claim 1, the closed end of said outer race including a disc-shaped dust plate within said outer race peripherally secured therein.

8. In a bearing assembly having an apertured outer race and an apertured inner race with a row of balls interposed therebetween, centrally apertured shanks of reduced diameter projecting from opposite sides of the inner race extending outwardly of the outer race, annular grease seals on said shanks bearing against said inner race, centrally apertured flexible discs tightly secured centrally upon said shanks retainingly engaging said seals and including flattened outer annular edge portions loosely positioned within said outer race, and centrally apertured retainer discs loosely positioned over said shanks respectively peripherally retained within the outer race and each with an interior immediate annular surface portion thereof in sliding surface contact with the respective annular edges of said flexible discs, sealing off the interior of said outer race from dirt and moisture.

9. In the bearing assembly of claim 8, said flexible discs including centrally apertured annular flanges tightly secured over said shanks.

10. The bearing assembly of claim 8 there being a pair of spaced circular rows of balls between said races.

11. The bearing assembly of claim 8, said flexible discs being of non-ferrous metal, said retainer discs being of ferrous metal.

12. In a ball bearing having an outer race and an apertured inner race with a row of balls interposed therebetween, one end of said outer race being closed, a centrally apertured shank of reduced diameter on said inner race projecting through the open end of the outer race, an annular grease seal on said shank bearing against said inner race, a centrally apertured flexible disc having inner and outer annular edges mounted around said shank retainingly engaging said seal, and a centrally apertured retainer disc loosely positioned over said shank peripherally retained within said outer race and having an intermediate interior annular surface portion, one of the annular edges of said flexible disc being secured to one of said races throughout 360 degrees and with the other annular edge of said flexible disc in sliding surface contact with the interior annular surface portion of said retainer disc throughout 360 degrees.

13. In a bearing assembly having an apertured outer race and an apertured inner race with a row of balls interposed therebetween, centrally apertured shanks of reduced diameter projecting from opposite sides of the inner race extending outwardly of the outer race, annular grease seals around said shanks bearing against said inner race, centrally apertured flexible discs, each having inner and outer annular edges, respectively mounted around said shanks retainingly engaging said seals, and centrally apertured retainer discs loosely positioned over said shanks respectively peripherally retained within the outer race of each with an interior intermediate annular surface portion, one of the annular edges of each of said flexible discs being secured to one of said races throughout 360 degrees and with the other annular edge of each flexible disc in sliding surface cantact with the interior annular surface portions of said retainer discs respectively throughout 360 degrees.

References Cited in the file of this patent

UNITED STATES PATENTS

| | | |
|---|---|---|
| 1,963,592 | Pribil | June 19, 1934 |
| 2,009,281 | Stein | July 23, 1935 |
| 2,161,210 | Waalkes | June 6, 1939 |
| 2,654,644 | Sutowski | Oct. 6, 1953 |
| 2,686,088 | Nelson | Aug. 10, 1954 |